United States Patent [19]

Myers et al.

[11] 4,435,147
[45] Mar. 6, 1984

[54] SPLIT INJECTION MOLD

[75] Inventors: William H. Myers, Raytown; Dennis L. Dundas, Lee's Summit, both of Mo.

[73] Assignee: Hoover Universal, Inc., Ann Arbor, Mich.

[21] Appl. No.: 367,653

[22] Filed: Apr. 12, 1982

[51] Int. Cl.³ ............................................. B29F 1/00
[52] U.S. Cl. .................................... 425/577; 425/533
[58] Field of Search ............................... 425/533, 577

[56] References Cited

U.S. PATENT DOCUMENTS 4,131,410 12/1978 Aoki .................................... 425/533

Primary Examiner—Thomas P. Pavelko
Attorney, Agent, or Firm—Stephenson and Boller

[57] ABSTRACT

This invention relates to an improved injection molding apparatus which enables change out of the injection mold without requiring core pin to injection mold cavity alignment for each change out operation. Automatic alignment is provided by pockets into which the injection mold halves fit. The injection mold halves and the pockets are configured to insure correct alignment.

5 Claims, 11 Drawing Figures

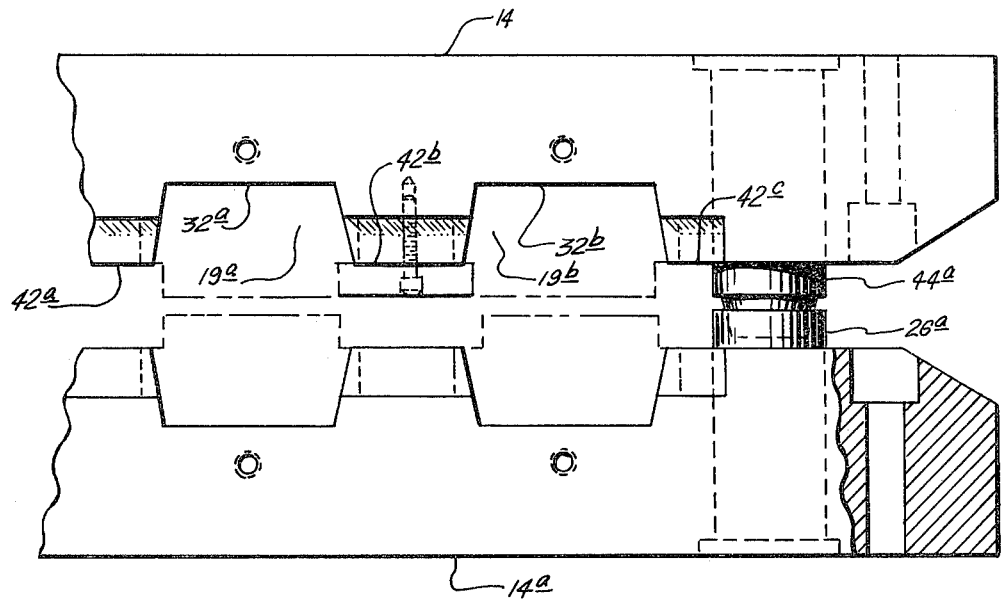
FIG. 9.
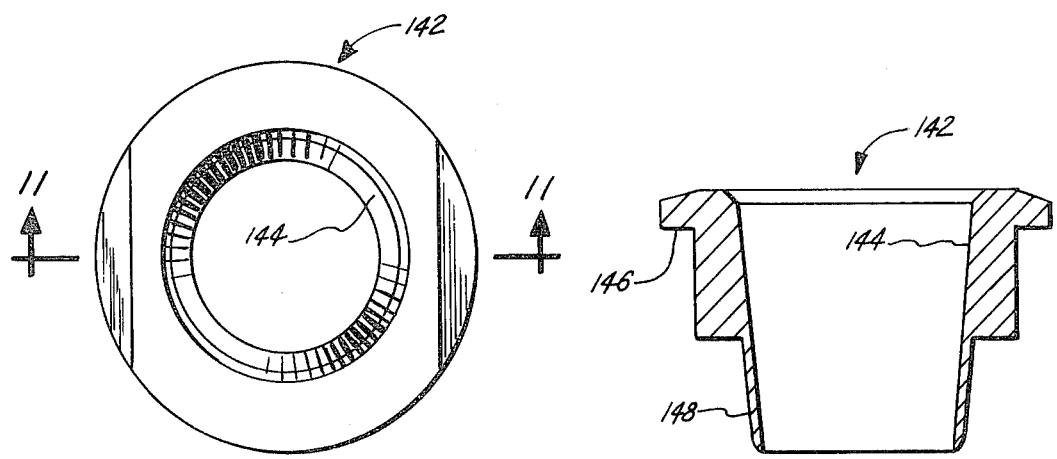
FIG. 10
FIG. 11.

SPLIT INJECTION MOLD

BACKGROUND OF THE INVENTION

It is well known in the art to form thermoplastic containers by injection formation of a closed end preform followed by a blowing of the preform to yield the desired container. See, for example, U.S. Pat. Nos. 3,850,562 and 4,151,247.

The apparatus and process described in U.S. Pat. No. 3,850,562 achieves the injection formation of the preform with the use of an unitary injection mold into which a core pin is inserted. Into the preform cavity, which is defined by the space between the core pin and the injection mold cavity, there is injected the thermoplastic material of choice. After this material has cooled sufficiently, the core pin is removed and the preform is stripped from the injection mold and sent to the blow molding portion of the apparatus. The preform, as it is being stripped from the injection mold, will undergo forces tending to distort or damage it. To enable the preform to withstand these forces without distortion, it must have a sufficient "set". The degree of "set" is dependent upon the extent to which the preform is cooled. Cooling is usually achieved by passing a cooling fluid through channels in the injection mold, and in some cases the core pin. Since cooling is achieved by heat transfer to the cooling fluid it is time dependent. It has been found that when using a unitary injection mold that the cooling time required to obtain sufficient "set" for deformation-free stripping of the preform from the injection mold exceeds the cooling time necessary when utilizing a split injection mold such as the one described in U.S. Pat. No. 4,151,247. By using a split injection mold, the degree of preform "set" is less than is necessary for a unitary injection mold due to the fact that the preform is removed from the split mold by having the molds open and move away from the preform and thus the forces on the preform are considerably less. Since the cooling time is lowered by using split injection molds, a shorter overall cycle time for the apparatus is required.

Despite this clear advantage, injection-blow molding apparatuses which utilize split injection molds have one serious drawback, i.e., the alignment of the split injection mold with the core pin must be assured with great exactitude so that when the molds come together to form the injection mold cavity, the core pin will be in exact alignment therewith. Such alignment is very time consuming and thus expensive. If there is not exact alignment, the core pin, when lowered into the cavity, will not be centered and the resultant preform will have variant wall thicknesses. Non-uniformity in preform wall thickness results in poor quality containers as the container will have thinned-out wall portions which represent weak spots in the containers.

The time penalty for achieving alignment is exacerbated if the molder has to achieve this alignment every time he has to change injection molds to fit new customer requirements. This extra time penalty could be avoided if the molder could achieve a single initial alignment and then merely change out customer moldings with each new customer mold taking its alignment cue from the initial alignment. Thus, only one alignment, i.e., the initial alignment, need be made irrespective of the number of mold changes required.

Therefore, it is an object of this invention to provide a system for use on a split mold injection-blow molding apparatus which requires only a single initial alignment irrespective of the number of times the split injection molds are changed out.

THE INVENTION

This invention relates to an improvement for use in prior art injection molding apparatuses which utilize two opposed platens that are powered for movement towards and away from one another and a core pin reciprocally moveable from a position outside of an injection mold cavity to a position inside of the mold cavity. (The mold cavity is defined by a pair of injection mold halves carried by the platens.) In these prior art apparatuses it is necessary to obtain alignment between the injection mold cavity and the core pin in each instance that the injection mold halves are changed out to suit various customer needs. The improvement of this invention makes possible "changeout" of the injection mold halves without need for alignment of the mold cavity and core pin on each instance of "changeout". Due to the unique parts of which the improvement of this invention is composed, the only alignment required will be the initial alignment.

The improvement which enables this "initial alignment only" feature is comprised of a split carrier which is comprised of two halves, one half being affixed to one of the platens and the other half being affixed to the other platen. Each of the split carrier halves has a pocket into which one of the injection mold halves will nest. Defining the pocket are a rear wall and two sidewalls. The rear planar wall lies in a plane substantially perpendicular to the long axis of the core pin movement. The two sidewalls are outwardly angled, with one of the side walls emanating from one latitudinal extent of the rear planar wall and the other of the side walls emanating from the other latitudinal extent. To align the mold cavity with a line of reference the injection mold halves are nested in the before-described pockets. Alignment of the cavity is achieved by the injection mold halves each having a planar rear wall and two opposed outwardly angled side walls which are dimensioned and configured to achieve aligned nesting of the injection mold halves in their respective pockets. Further, the split carrier has, affixed thereto, in a position adjacent to the pocket, a split alignment structure. When the core pin is positioned inside of the injection mold cavity the split alignment structure functions, in cooperation with core pin alignment structure carried by the core pin, to align the core pin with the same line of reference to which the mold cavity is aligned. Attaching mechanism is utilized for removably holding the injection mold halves within their respective pockets.

Initial alignment is achieved by aligning the carrier halves on their respective platens so that the initial mold halves which are nested in the carrier pockets will achieve alignment with the line of reference. Also, the alignment structure must be properly aligned so that the core pin, upon its being lowered into the injection mold cavity, will be aligned with this same line of reference. Thereafter, a change of the injection mold halves requires merely changing one set of mold halves from the mold pocket with another set of mold halves. Alignment of the core pin with the mold cavity will not be compromised as the split carrier and the alignment structure are not moved or changed.

These and other features of this invention contributing to satisfaction in use and economy in manufacture will be more fully understood from the following description of a preferred embodiment which is illustrated in the accompanying drawings and in which identical numerals refer to identical parts and in which:

FIG. 9 is a partial bottom plan view of the split carrier shown in FIGS. 1 and 2;

FIG. 10 is a top plan view of the neck ring bushing shown in FIGS. 1 and 2; and

FIG. 11 is a sectional view taken through section lines 11—11 in FIG. 10.

Figure 1:
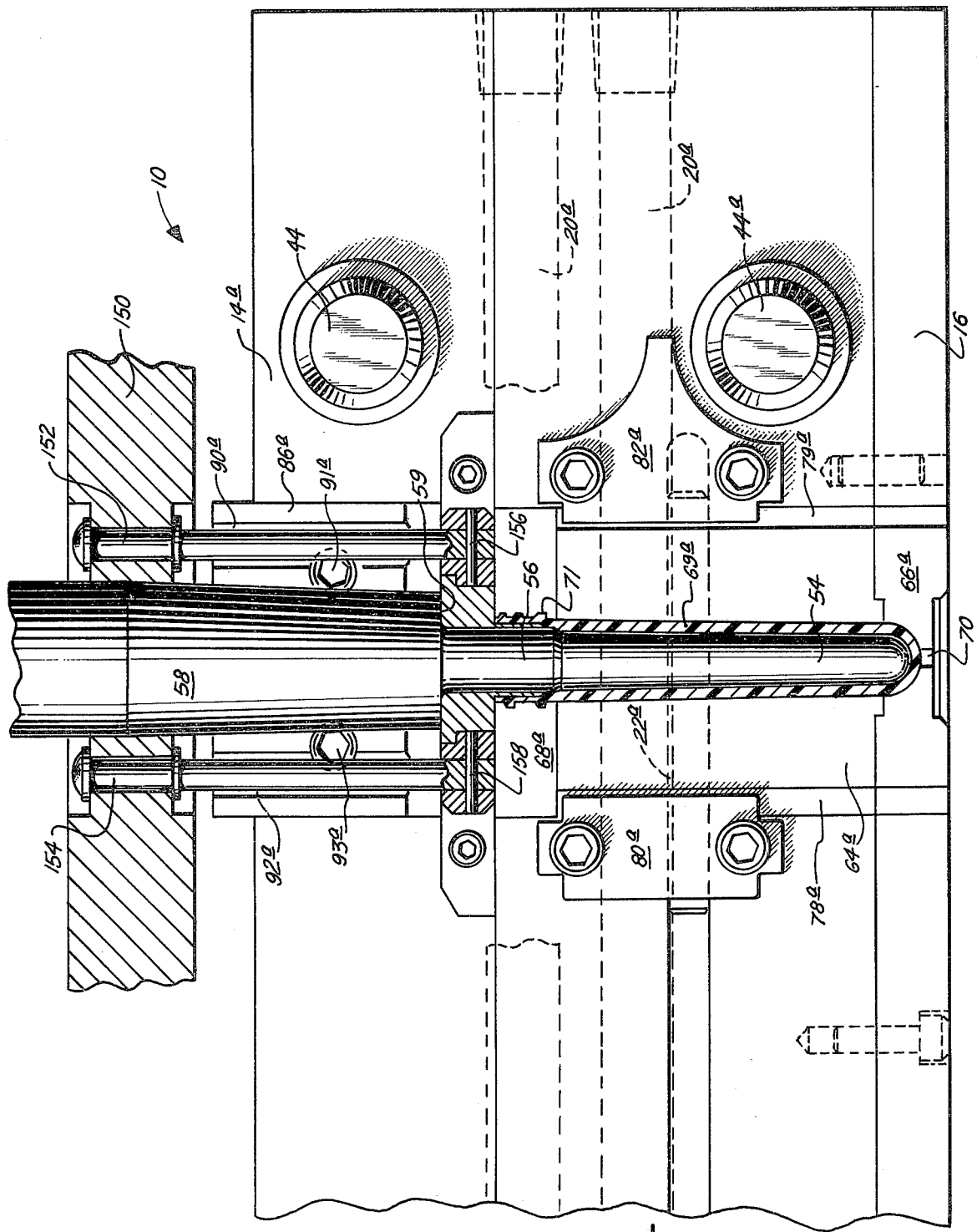
FIG. 1 is a side elevational view of one side of a split injection mold assembly.
Figure 2:
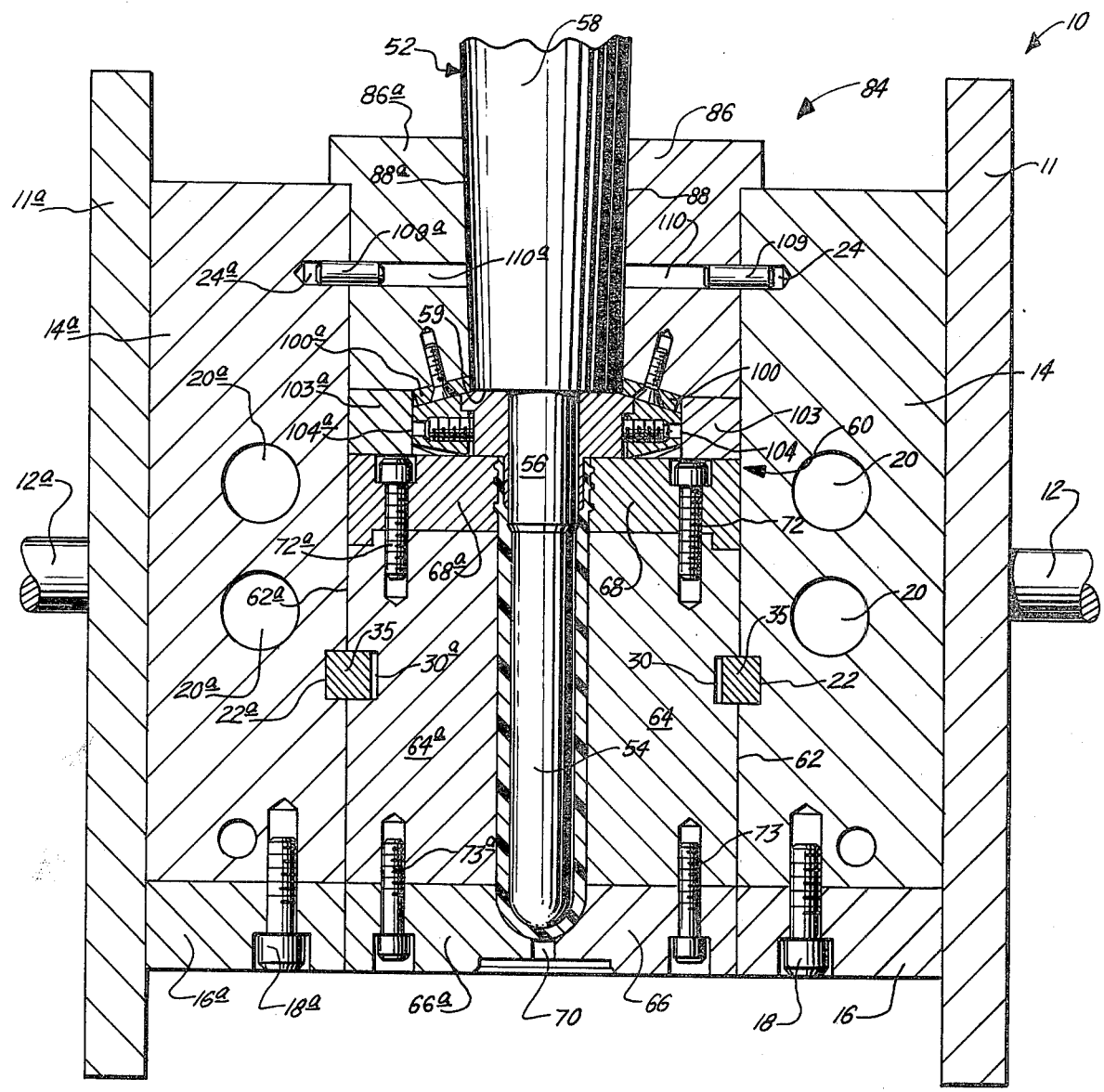
FIG. 2 is a sectional view of the split injection mold assembly shown in FIG. 1 showing both halves of the assembly.

Referring now to FIGS. 1-2 there can be seen a split injection mold assembly, generally designated by the numeral 10, which includes two oppositely opposed platens 11 and 11a, a split carrier made up of carrier halves 14 and 14a, a split injection mold 60, a split alignment assembly 84 and a core pin assembly 52. The platens 11 and 11a are powered for movement toward and away from one another. Generally speaking this powered movement is provided by double acting hydraulic rams which are represented in FIG. 2 by shafts 12 and 12a.

Attached to the inside face of each of the platens are split carrier halves 14 and 14a. This attachment is most conveniently achieved by bolting techniques. As is seen in FIG. 2, carrier halves 14 and 14a each have cooling water channels which are numbered 20 and 20a respectively. At the bottom most extent of carrier halves 14 and 14a there is bolted by means of bolts 18 and 18a, bottom carrier plates 16 and 16a respectively.

Figure 3:
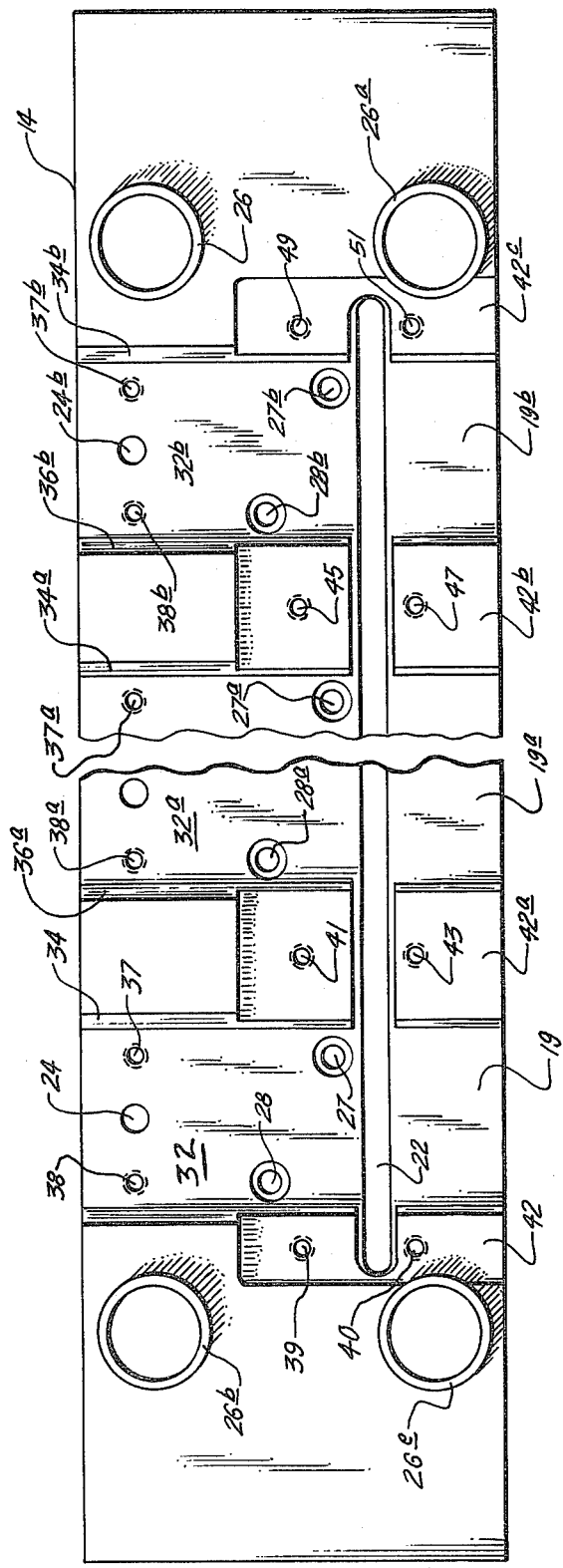
FIG. 3 is a side elevational view of the split carrier shown in FIGS. 1 and 2.

As can been seen in FIG. 3, there is shown carrier half 14. Since carrier half 14a is identical to carrier half 14, the following description of carrier half 14 is likewise applicable to carrier half 14a. In FIG. 3, carrier half 14 is shown to have multiple pockets 19, 19a and 19b. The number of pockets used will correspond to the number of injection molds which are to be run simultaneously. The depiction of three cavities for carrier half 14 in FIG. 3 is for illustrative purposes only and is not meant to limit the number of pockets possible. Cutting across pockets 19, 19a and 19b is carrier keyway 22. This keyway will cooperate with the keyway found on the back wall of the injection mold halves, as hereinafter described, for the purpose of maintaining the injection mold halves in its respective pockets. At each end of carrier 14 there is shown alignment cups 26, 26a, 26b and 26c. On carrier half 14a there is a corresponding number of alignment bosses (two of which can be seen in FIG. 1) which mate with the cups to assure alignment between the carrier halves 14 and 14a. As mentioned previously, carrier halves 14 and 14a have cooling water channels 20 and 20a. These cooling water channels are for the purpose of providing a pathway for cooling water to the injection mold halves to enable, in situ, cooling of the injection formed preform during the injection molding cycle. To communicate water from cooling water channel 20 through the injection mold halves which will be associated with carrier 14, there is provided cooling water ports 28, 27, 28a, 28b and 27b. As can be seen in FIG. 3, two ports are provided for each pocket so that water enters one port and exit via the other port. On each side of each pocket there is provided a recessed flat. These recessed flats are seen in FIG. 3 and are designated by the numerals 42, 42a, 42b and 42c. These flats are provided for affixing hereinafter described keepers which are utilized to hold the injection mold halves in their respective pockets. The keepers are affixed to these recessed flats by means of bolting and thus threaded bores 39, 40, 41, 43, 45, 47, 49 and 51 are provided for achievement of the bolting attachment.

Each of the before-described pockets are defined by a planar rear wall and two angled side walls. One of the angled side walls emanates from the right most extent of the planar rear wall, while the other side emanates from the left most extent of the planar rear wall. Pocket 19 is defined by planar rear wall 32 and angled side walls 34 and 36 while pocket 19a is defined by planar rear wall 32a and angled side walls 34a and 36a. Pocket 19b is defined by planar rear wall 32b and angled side walls 34b and 36b.

At the upper end of each pocket as seen in FIG. 3, there are centered pin bores 24, 24a and 24c. On each side of the pin bores there are threaded bores 37, 38, 37a, 38a, 37b and 37a. The pin bores and the threaded bores are for use in accurate attachment of alignment halves 86 and 86a as hereinafter described.

Core pin assembly 52 is illustrated in FIGS. 1 and 2. Core pin assembly 52 is reciprocally movable from a position between carrier halves 14 and 14a to a position above these two carrier halves. The core pin assembly basically comprises a core pin portion 54 which is basically a round shaft having a hemispherical distal end. This configuration has been found suitable for production of hollow, closed end preforms having a "test tube" shape. At the proximate end of core pin 54 there is mid core pin portion 56. This mid portion has a diameter slightly larger than the core pin portion 54. By providing for this larger diameter, more stability is provided for the core pin portion 54. Immediately above mid portion 56 there is truncated cone portion 58. As can be seen the smallest diameter of truncated core portion 58 is significantly larger than the diameter of the mid portion 56. This difference in diameters provides cone pin assembly 52 with a shoulder which is labeled by the numeral 59 in FIGS. 1 and 2. Truncated cone portion 58 will be utilized in conjunction with alignment halves 86 and 86a, as hereinafter described, for achieving alignment of core pin portion 54 with a line reference which, for the embodiment shown in the drawings, will be the central line of the injection cavity which is defined by injection mold cavities 69 and 69a.

Split injection mold 60 is comprised of two injection mold halves 62 and 62a. Each half in turn is comprised of three mold portions. Injection mold half 62 has an upper mold portion 68, a mid-mold portion 64, and a lower mold portion 66 while injection mold half 62a has an upper mold portion 68a, a lower mold portion 66a and a mid-mold portion of 64a. It has been found convenient to correct the mold portions of each half together by the utilization of bolting. Bolts 72 and 73 accomplish this purpose for injection mold half 62 while bolts 72a and 73a accomplish this same purpose for injection mold half 62a. Upper mold portions 68 and 68a define neck finish cavity 71 which, for the embodiment shown in the drawings, provides for a thread about the neck of the injection formed preform. Lower mold portions 66 and 66a provide for injection port 70 through which the molten thermoplastic material will be injected into the mold cavity which is defined by mold cavity halves 69 and 69a provided by mid-mold portions 64 and 64a.

Figure 4:
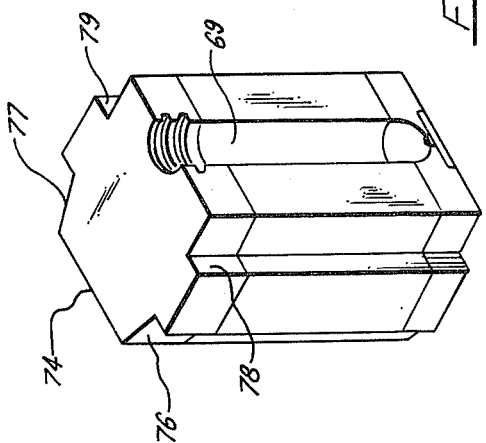
FIG. 4 is a prespective view of one half of the split injection mold shown in FIGS. 1 and 2.

In FIG. 4 injection mold half 62 is shown. Since injection mold half 62 is identical to injection mold half 62a, a description of the former is equally applicable to the latter. From FIG. 4 it is seen that injection mold half 62 has a planar rear wall 74. The latitudinal extent of planar rear wall 74 is essentially the same as the latitudinal extent of the planar rear wall in each pocket. Further, the angled side walls 76 and 77 that are found on injection mold half 62 are angled outwardly to the same extent that the carrier pocket side walls are angled. Thus, injection mold half 62 is nestable within a carrier pocket. By utilizing angled side walls for the pocket and for the split injection mold half, this nesting results in very exact alignment of the injection mold half with respect to the pocket in which it is nested. As mentioned previously, carrier keyway 22 and 22a act in cooperation with keyways found in the injection mold halves. This cooperative relationship is shown in FIG. 2 with mold keyways 30 and 30a being found across the planar rear walls of the injection mold halves. Fitable within the hollow space defined by the carrier keyways and the mold keyways are keys 35 and 35a. The use of the key-keyway combination provides for support of the injection mold halves in their respective pockets.

Also provided as a part of each injection mold half are left and right recessed front walls. As is seen in FIGS. 1 and 4 these recessed front walls extend a greater width outwardly than the face of the injection mold half with which they are associated. For injection mold half 62 these recessed front walls are labeled 78 and 79 while for injection mold half 62a they are labeled 78a and 79a. These recessed front walls act in conjunction with keepers to aid in supporting the injection mold halves in their pockets. Exemplary of such keepers are the ones shown in FIG. 1 and labeled 80a and 82a. As mentioned previously, these keepers are bolted onto the recessed flats which are found on each side of each carrier pocket. Note that each keeper has a lip which extends inwardly of the pocket with which they are associated. This inward extention of the lips allows it to extend over a part of the recessed front walls to hold the injection mold halves in their respective pockets.

Figure 5:
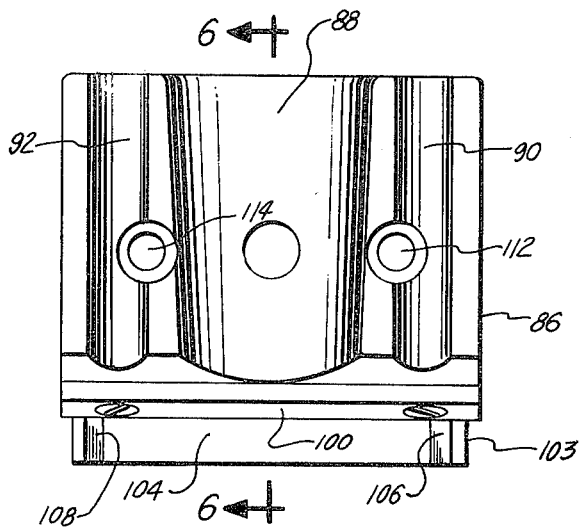
FIG. 5 is a side elevational view of one of the alignment halves shown in FIG. 2.
Figure 6:
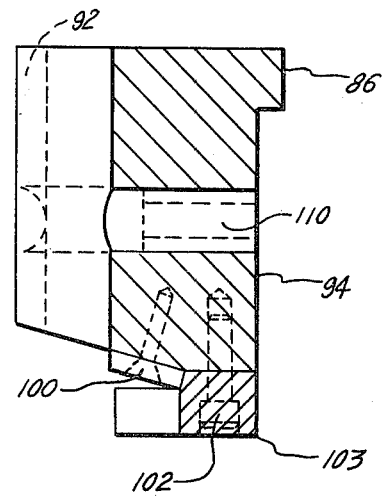
FIG. 6 is a sectional view taken through section lines 6—6 in FIG. 5.

As mentioned previously, truncated cone portion 58 of core pin assembly 52 cooperates with split alignment assembly 84 to effect alignment of core pin portion 54 with a line of reference. Split alignment assembly 84 can be seen in FIGS. 1, 2, 5 and 6. Split alignment assembly 84 is made up of two alignment halves 86 and 86a. Since the alignment halves are identical, a description of one half is equally applicable to the other half. As can be seen in FIGS. 5 and 6, alignment half 86 has tapered bore cavity half 88. As can be appreciated, mating this bore cavity half with the tapered bore cavity half 88a of alignment half 86a will provide a tapered bore into which truncated core portion 58 can fit. In tapered bore cavity half 88 there is aperture 110. Aperture 110 will be congruant with the pin bore which is in the pocket to which the alignment half will be associated. As seen in FIG. 2, pins 109 and 109a are fitted within the apertures and bores as depicted.

Affixing the alignment halves to their carrier pockets is achieved by bolting through apertures 112 and 114. Exemplary of such bolting is the counter-sunk bolting with bolts 91a and 93a as shown in FIG. 1.

Each alignment half has a planar rear wall and a left and right angled side wall found at the left and right latitudinal extent of the rear planar wall. Planar rear wall 94 for alignment half 86 is shown in FIG. 6. The angled side walls are not shown, but have the same configuration and angle as the angled side walls of the pockets. In addition, the dimensions of planar rear wall 94 is such that it is essentially coextensive with the planar rear wall of the pocket to which the alignment half is associated. Thus, the placement of the alignment half in a carrier pocket assures that the alignment half will be properly registered and aligned.

On each side of the tapered bore cavity half is a rod bore cavity half. The position and configuration of the rod bore cavity halves can be seen in FIG. 5 and are designated by the numerals 90 and 92. The rod bore cavity halves for alignment half 86a are shown in FIG. 1 and are designated by the numerals 90a and 92a. The function of these rod bore cavity halves will be hereinafter described. At the bottom of the alignment halves there is found downwardly facing front wall 98. As can be seen in FIGS. 5 and 6 the downward taper of downwardly facing front wall is away from the front face of the alignment half. In downwardly facing front wall 98 are two threaded bores for use with bolts for fixing wear plate 100 thereto. Another wear plate is affixed to alignment half 86 (i.e., bottom wear plate 103). Attachment of bottom wear plate 103 to alignment half 86 is achieved by utilization of counter-sunk bolt 102. Note that bottom wear plate 103 has a front wall 104 and outwardly angled side walls 106 and 108. The configuration and dimensioning of wear plate 100 and bottom wear plate 103 is such that neck ring bushing carrier 116 will be forced into alignment with core pin assembly 52 upon the closing of split injection mold 60. This alignment is forced by the abutment of the walls defined by wear plates 100 and 103 with the beveled surfaces of neck ring bushing carrier 116. This aligning relationship is shown in FIG. 2.

Figure 7:
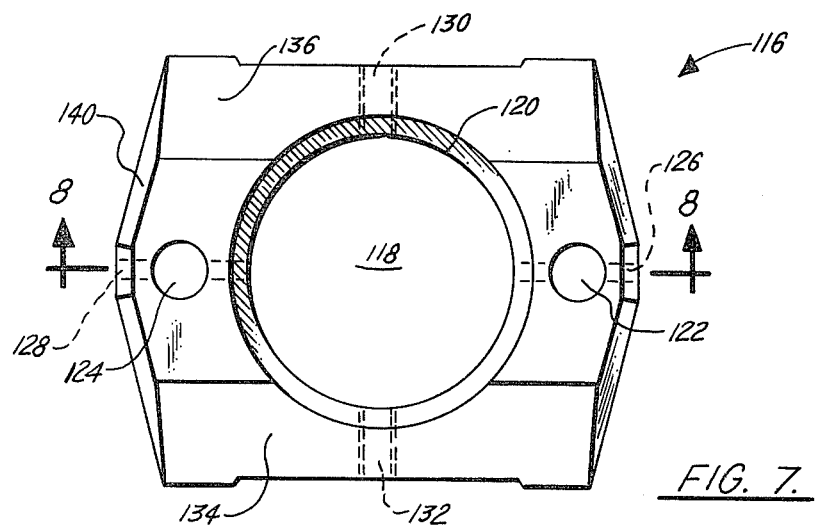
FIG. 7 is a top plan view of the neck ring bushing carrier shown in FIGS. 1 and 2.
Figure 8:
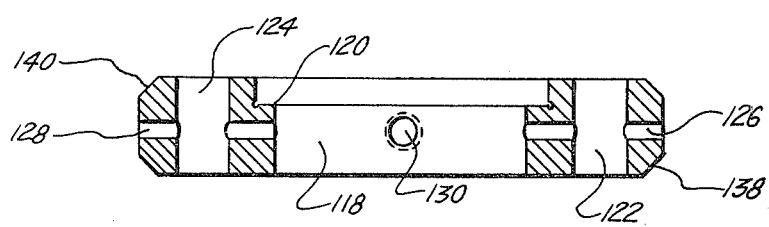
FIG. 8 is a sectional view taken through section lines 8—8 in FIG. 7.

Neck ring bushing carrier 116 has a circular hole 118 through its center. Coaxial with and circumventing circular hole 118 is annular ledge 120. On each side of circular hole 118 are rod bores 122 and 124. Traversing rod bores 122 and 124 are pin bores 126 and 128 respectively. As can been seen in FIG. 1, transport rods 152 and 154 will terminate in rod bores 122 and 124 respectively. Pins 156 and 158 are inserted into pin bores 126 and 128 respectively to affix transport rods 152 and 154 to neck ring bushing carrier 116 as is shown in FIG. 1. Transport rods 152 and 154 are in turn attached at their other ends to transport assembly 150. As mentioned previously, registration and alignment of neck ring bushing carrier 116 is accomplished by coaction between the wear plates carried by the alignment halves and beveled surfaces found on neck ring bushing carrier 116. Some of these beveled surfaces are shown in FIG. 7 and are labeled 134, 136, 138 and 140. Also, as can been seen in FIG. 7, there are threaded bores 130 and 132 which intersect circular hole 118. These threaded bores are for use in affixing neck ring bushing 142 to neck ring bushing carrier 116.

As can be seen in FIGS. 10 and 11, neck ring bushing 142 has an annular tapered inside wall 144. Annular tapered inside wall 144 achieves nesting relationship with mid portion 56 of core pin assembly 52 as can be seen in FIGS. 1 and 2. Neck ring bushing 142 additionally has an annular side wall 146 which is dimensioned to overlie annular ledge 120 of neck ring bushing carrier 116. At the bottom most extent of neck ring bushing 142, is annular neck ring 148. As can be seen in FIGS. 1 and 2, annular neck ring 148 will fit inside the neck finish of the injection formed preform. This fit is a fairly tight fit as the thermoplastic material will contract as it cools. Upon opening of split injection mold 60 and removal of core pin assembly 52 from the preform, the preform will be suspended from annular neck ring 148. To insure rigid connection between neck ring bushing carrier 116 and neck ring bushing 142 set screws are utilized within threaded bores 130 and 132 in a conventional manner.

To achieve the desirable alignment qualities of the injection molding assembly of this invention a simple procedure is followed. It is important to note that this procedure need only be utilized initially and that subsequent changing of the split injection mold will not require subsequent alignment. Initially, carrier halves 14 and 14a are affixed to platens 11 and 11a respectively. The injection mold halves are then affixed to the pockets found in the carrier halves. Also affixed in the pockets are the alignment halves which form the split alignment assembly. Due to the unique configuration of the rear and side walls of the pockets and the rear and side walls of the injection mold halves and the alignment halves, a placement of the alignment halves and the injection mold halves in the pocket result in alignment of the alignment halves and the injection mold halves with each other. The carrier halves are then adjusted on the platens so that the core pin portion of the core pin assembly will nest in perfect alignment inside of the injection mold cavity defined by the split injection mold. Also, with the alignment halves being in proper alignment with respect to the injection mold halves, the neck ring bushing carrier and the neck ring bushing will be in their proper alignment so that they will not interfere with movement of the core pin assembly. Once alignment has been achieved, the injection mold halves are brought together by the inward movement of the platens. Upon being brought together, the injection mold halves will form an injection mold cavity. The core pin assembly is then lowered so that the core pin portion will be positioned within the injection mold cavity. Thermoplastic material in a molten state and under high pressure is injected through injection port 70. After injection has been accomplished, cooling fluids are circulated through the injection mold halves to render the thermoplastic material in a solid state.

After sufficient cooling has been achieved, the core pin assembly is removed to its upward position. The platens are then moved out and away from each other so that the injection mold halves will move away from the injection molded preform. The injection molded preform will be suspended from the neck ring bushing as the bushing has achieved a tight fit with the inside of the neck finish of the preform. The transport assembly is then activated so that the attached preform is moved to subsequent operational stations. Note that the neck ring bushing carrier and the neck ring bushing move with the preform from its origin to its final disposition.

If it should be desired to change out the injection mold half so that a preform having a different configuration can be produced, it is only necessary to unbolt the mold halves and remove them from their respective pockets. The replacement mold halves have the same planar rear wall and angled side walls as the initial injection mold halves and thus they can be similarly placed in the now empty carrier pocket. Since the planar rear wall and angled side wall configuration assures alignment of the replacement mold halves with the carrier pocket, the replacement injection mold halves will assume the same identical alignment as the original injection mold half. There is no need for any further alignment procedures. Thus, it can be seen that "change out" is indeed a very simple and easily accomplished maneuver.

We claim:

1. An improved injection molding apparatus having two opposed platens which are powered for movement towards and away from one another and a core pin reciprocally movable from a position outside of an injection mold cavity to a position inside of such mold cavity, said injection mold cavity being defined by a pair of injection mold halves carried on said platens, the improvement comprising:
   a. a split carrier means, one-half of said split carrier means being affixed to one of said platens and the other of said split carrier means being affixed to said other platen, each of said split carrier halves having,
      i. a pocket into which one of said injection mold halves nest, said pocket having (a) a rear planar wall lying in a plane substantially perpendicular to the long axis of said core pin movement, and (b) two outwardly angled side walls, one of said side walls emanating from one latitudinal extent of said rear planar wall and the other of said side walls emanating from the other latitudinal extent; and,
      ii. a split alignment means for aligning said core pin with a line of reference when said core pin is positioned inside of said injection mold cavity, one of said split alignment means halves being affixed to one of said split carrier halves and the other of said split alignment means halves being affixed to the other of said split carrier means halves; and,
      iii. a core pin alignment means carried at the upper extent of said core pin, said core pin alignment cooperating with said split alignment means to effect said core pin alignment with said line of reference; and
   b. said injection mold halves each having a planar rear wall and two opposed outwardly angled side walls, said planar wall and said side walls being dimensioned and configured to achieve aligned nesting of each injection mold half in its respective pocket whereby said injection mold cavity will be in alignment with said line of reference; and
   c. means for removably affixing each of said injection mold halves to its respective pocket.

2. The injection molding apparatus of claim 1 wherein said alignment means is a truncated cone integral with said core pin and wherein said split alignment means comprises a split block in which each split block half has a cavity half, said cavity halves together defining a tapered bore into which said truncated cone portion of said core pin will nest upon said core pin being moved inside of said split injection mold cavity, said nesting of said core pin in said tapered bore effecting said alignment of said core pin with said line of reference.

3. The injection molding apparatus of claim 2 wherein said pockets each additionally accommodate one of said split block halves, and wherein each of said split block halves has a planar rear wall and two opposed outwardly angled side walls, said planar rear wall and said side walls being dimensioned and configured to achieve aligned nesting of each of said split block halves in its respective pocket.

4. The injection molding apparatus of claim 1 wherein said means for removably affixing each of said injection mold halves to its respective pocket comprises two plates removably attached to each half of said split carrier means, one plate being adjacent one side of said pocket and the other plate being adjacent to the other side of said pocket, whereby when said injection mold half is nested in said pocket, said plates overlie a portion of each front side of said injection mold half.

5. The injection molding apparatus of claim 4 wherein said means for removably affixing each of said injection mold halves to its respective pocket additionally comprises: a first hollow latitudinally extending keyway in said planar rear wall of each of said injection mold halves; a second hollow latitudinally extending keyway in said rear planar wall of each of said pockets; and a key fitable into each composite keyway formed by the congruence of said first and second keyways when each of said split injection mold halves are nested in their respective pockets.

* * * * *